(12) United States Patent
Jaeger

(10) Patent No.: US 8,257,149 B2
(45) Date of Patent: Sep. 4, 2012

(54) METHOD OF PRODUCING ROTATIONALLY SYMMETRICAL SURFACES ON A WORKPIECE

(75) Inventor: Helmut Jaeger, Koenigsbach-Stein (DE)

(73) Assignee: FELSOMAT GmbH & Co. KG, Koenigsbach-Stein (DE)

( * ) Notice: Subject to any disclaimer, the term of this patent is extended or adjusted under 35 U.S.C. 154(b) by 1042 days.

(21) Appl. No.: 12/224,592

(22) PCT Filed: Dec. 8, 2006

(86) PCT No.: PCT/DE2006/002182
§ 371 (c)(1),
(2), (4) Date: Aug. 28, 2008

(87) PCT Pub. No.: WO2007/098725
PCT Pub. Date: Sep. 7, 2007

(65) Prior Publication Data
US 2009/0075565 A1    Mar. 19, 2009

(30) Foreign Application Priority Data
Mar. 1, 2006    (DE) .......................... 10 2006 009 276

(51) Int. Cl.
*B24B 1/00*    (2006.01)

(52) U.S. Cl. .......................................... 451/49; 451/58

(58) Field of Classification Search ................... 82/1.11; 451/49, 50, 57, 58; 492/57
See application file for complete search history.

(56) References Cited

U.S. PATENT DOCUMENTS

| 552,717 | A | 1/1896 | McClellan | |
|---|---|---|---|---|
| 3,728,917 | A | 4/1973 | Kaesemeyer | |
| 5,156,502 | A | 10/1992 | Satran | |
| 5,218,893 | A | 6/1993 | Shikata | |
| 5,349,888 | A | 9/1994 | Schmid | |
| 5,827,017 | A | 10/1998 | Tägström | |
| 5,975,987 | A * | 11/1999 | Hoopman et al. | 451/28 |
| 6,615,722 | B2 * | 9/2003 | Alberstadt et al. | 101/375 |
| 6,733,365 | B1 * | 5/2004 | Shaw et al. | 451/21 |
| 6,824,333 | B1 | 11/2004 | King et al. | |
| 7,771,333 | B2 * | 8/2010 | Spiess et al. | 492/59 |
| 2009/0124476 | A1 * | 5/2009 | Wu | 492/57 |

FOREIGN PATENT DOCUMENTS

| DE | 41 19 162 C1 | 5/1992 |
|---|---|---|
| DE | 42 23 645 A1 | 1/1993 |
| DE | 10 2005 037 665 B3 | 1/2007 |
| WO | WO 2007/016910 A2 | 2/2007 |

* cited by examiner

*Primary Examiner* — Timothy V Eley
(74) *Attorney, Agent, or Firm* — Walter A. Hackler

(57) ABSTRACT

The invention relates to a method, in particular a turning method, for producing a rotationally symmetrical surface on a rotating workpiece (1), wherein a cutting edge (3) is inserted into the workpiece (1) many times. During each insertion (41), a new contour portion (11; 34), also referred to as a groove, is formed. The insertion positions lie so closely together that the resulting contour (7) generated on the workpiece (1) consists exclusively of adjacent residual contours or residual grooves (11') which have arisen from the new contour portions or grooves (11; 34). Any interim contour portions (24) which have formed between the insertion positions during repositioning of the cutting edge (3) are removed again during the next insertion (41). The resulting rotationally symmetrical surface is twist-free. The method can be implemented using conventional lathes.

12 Claims, 4 Drawing Sheets

METHOD OF PRODUCING ROTATIONALLY SYMMETRICAL SURFACES ON A WORKPIECE

The invention relates to a method of producing a rotationally symmetrical surface on a workpiece, wherein the workpiece rotates and a cutting edge is brought into contact with the surface of the workpiece.

A method of this type is known from DE 10 2004 026 675 B3.

In order to produce rotationally symmetrical surfaces on workpieces, various machining methods are known, in particular grinding and turning.

In the case of grinding and turning, the unfinished workpiece, which is still larger by the amount of the oversize than the workpiece to be produced, is clamped in a clamping means of a workpiece spindle and set into rotation. A tool with a cutting edge is moved towards the rotating workpiece and comes into contact with the surface of the workpiece, from which it removes material. In the case of grinding, the tool is a rotating grinding wheel provided with suitable grinding means such as diamond grains. In the case of turning, the tool is a non-rotating component with a high-strength, hard edge, for example a lathe tool or a ceramic indexable insert.

The cutting edge is guided along the workpiece in accordance with the desired contour of the workpiece to be produced. In this case, the contour is the profile of the workpiece in a plane containing the rotation axis of the workpiece and the contact point or contact region between the cutting edge and the workpiece.

When the cutting edge is guided along the desired contour, feed marks substantially in the shape of a thread (also referred to as workpiece twist) are formed on the workpiece, in the particular in the case of turning. These feed marks detrimentally affect the possible uses of the workpiece and are therefore undesirable.

Turning methods which are intended to prevent the formation of feed marks ("twist-free turning") are known from the prior art.

It is known from DE 199 63 897 A1, which describes a turning method, to guide a straight cutting edge in a linear movement tangentially along a cylindrical workpiece. The cutting edge lies in the tangential plane of the workpiece, but is angled in relation to the linear movement direction.

It is known from DE 10 2004 026 675 B3, which also describes a turning method, to mount a tool rotatably on a swivel axis so that a straight cutting edge can be moved past a workpiece in a circular movement. The swivel axis can be arranged parallel to the rotation axis in order to produce a cylindrical outer surface of a workpiece. The swivel axis can also be arranged perpendicularly to the rotation axis and intersect the latter in order to produce an end face of a workpiece. In this case, the cutting edge is angled in relation to the swivelling direction.

These methods of the prior art bring with them a number of disadvantages. On the one hand, they require special machine kinematics in order to be able to guide the cutting edges along the intended path relative to the workpiece. In other words, these methods cannot be implemented by conventional lathes because they do not possess the necessary degrees of freedom of tool movement. Furthermore, very expensive tools are necessary because the quality demands on the cutting edges are very high. As the contact point between the tool and the workpiece shifts along the cutting edge in these methods, even the smallest chips on the cutting edge lead to rejects. Lastly, owing to the high loads on the cutting edges, only cutting depths of approximately 0.05-0.1 mm can be achieved with the known methods, whereas a typical oversize of workpieces amounts to 0.2-0.3 mm. Therefore, a workpiece initially has to be conventionally preturned and is then finished in a twist-free manner by one of the above methods. Consequently, twist-free machining is overall very time-consuming.

SUMMARY OF THE INVENTION

In contrast, the object of the present invention is to provide a method by means of which twist-free, rotationally symmetrical surfaces can be produced on a workpiece in a simple and inexpensive manner, in particular in which conventional lathes and tools can be used.

This object is achieved by a method of the initially described type, characterised by the following steps:
a) the cutting edge is inserted into the rotating workpiece, wherein the cutting edge is moved towards the surface to be generated on the workpiece, and wherein a new contour portion (=groove) is formed on the workpiece and has a width B, measured parallel to the surface to be generated on the workpiece,
b) the cutting edge is then repositioned by means of the following sub-steps:
b1) the cutting edge is lifted from the workpiece, during which the cutting edge undergoes a movement component perpendicularly away from the surface to be generated on the workpiece;
b2) the cutting edge is advanced, during which the cutting edge undergoes a movement component parallel to the surface to be generated on the workpiece;
wherein the total length of the displacement path VP of the cutting edge parallel to the surface to be generated on the workpiece in steps a) and b) is smaller than or equal to the width B;
c) steps a) to b) are repeated multiple times.

The crux of the method according to the invention is to generate on a workpiece a surface which is formed substantially only by insertion of the tool.

For this purpose, the tool is inserted into the workpiece many times (typically a few hundred times or more). After each insertion, the tool is lifted and displaced slightly, typically in an axial direction in relation to the rotation axis. During this repositioning process, the tool can remain in contact with the workpiece constantly or intermittently and remove material from the workpiece. The next insertion then takes place. The distance between adjacent insertion positions (i.e. the displacement path VP) is smaller than or equal to the width of the contour portion newly generated on the workpiece during insertion. This width substantially corresponds to the width of the cutting edge that is active during insertion (i.e. that participates in the removal of material). It is thereby ensured that the contour generated on the workpiece is built up exclusively from contour portions which have been generated by insertion. Any contour portion generated on the workpiece during repositioning of the tool and affected by twist is removed again by the next insertion.

A contour portion generated on the workpiece by insertion is always twist-free. Consequently, the rotationally symmetrical surface which is generated by the method according to the invention and comprises directly adjacent contour portions generated by insertion is also twist-free.

The method according to the invention can be used both in the case of turning, in particular hard turning, and in the case of grinding. It is usable on any sufficiently rigid turning or grinding machine.

It should be noted that the surface to be generated on the workpiece in accordance with the invention does not need to extend parallel to the rotation axis of the workpiece, i.e. not only cylindrical outer surfaces, but also conical outer surfaces or curved surfaces can be produced.

PREFERRED VARIANTS OF THE INVENTION

A quite particularly preferred variant of the method according to the invention is characterised in that in the whole step b) a maximum lifting path AW perpendicularly away from the surface to be generated on the workpiece is smaller than the local oversize LA of the workpiece. Consequently, the cutting edge is used for the removal of material during repositioning, in particular during sub-step b2). The cutting edge can thus be used for longitudinal turning (feed turning) during repositioning. Premachining and finishing are carried out in one operation. Furthermore, the removal of material during repositioning uses a different part of the cutting edge than is used during insertion (recessing), so that wear to the part of the cutting edge that is active during insertion can be reduced. The local oversize LA designates the excess material to be removed from the workpiece in relation to the surface to be generated, measured perpendicularly to the surface to be generated, in the region of the workpiece being machined. This variant of the method can achieve outstanding surface qualities, in particular in the case of hard turning.

In a preferred further development of this variant, the lifting path AW amounts to 0.02 mm or less, in particular approximately 0.01 mm. These lifting paths have proved successful in practice, in particular in the case of hard turning. They are sufficiently great to be able to remove again the twist produced during longitudinal turning, and small enough that the lifting time required in the course of the method makes little difference.

In another preferred further development of the above variant of the method, the local oversize LA amounts to 0.1 mm to 0.4 mm, in particular approximately 0.3 mm. In practice, in particular in the case of hard turning, the method according to the invention was easily able to handle a local oversize within this range.

Also preferred is a method variant which is characterised in that in step a) the cutting edge remains in the inserted position during at least one revolution, in particular precisely one revolution, of the workpiece. With at least one revolution, the new, twist-free contour portion is generated in a step-free manner over the entire circumference of the workpiece. With precisely one revolution, the method variant proceeds particularly quickly and thus economically. The cutting edge preferably remains stationary in the inserted state. According to the invention, an electronic control system can be used for synchronisation of the workpiece and the cutting edge.

Especially preferred is a method variant in which sub-step b1) takes place before sub-step b2). Steps b1) and b2) are not coupled in this variant, which simplifies method control and monitoring. The lifting and feed functions are separated from one another, and sub-steps b1) and b2) can be individually optimised for these respective functions, in particular with respect to the speed of movement and the movement direction of the cutting edge.

A further development of this variant of the method provides that in step b1) the cutting edge is moved exclusively perpendicularly away from the surface to be generated on the workpiece, and in step b2) the cutting edge is moved exclusively parallel to the surface to be generated on the workpiece. With these orientations, the sequences of sub-steps b1) and b2) can easily be adjusted and optimised separately. Alternatively, for example, the cutting edge can also always be displaced perpendicularly to the rotation axis in step a) and always parallel to the rotation axis of the workpiece in step b2).

An advantageous alternative variant of the method provides that sub-steps b1) and b2) take place simultaneously. In this way, the number of movement steps of the cutting edge in the method can be minimised, and the method sequence can thus be accelerated overall.

Also preferred is a method variant according to the invention in which in step a), during the movement of the cutting edge towards the surface to be generated on the workpiece, the cutting edge is moved exclusively perpendicularly to the surface to be generated on the workpiece. This type of insertion ensures substantially identical new contour portions (=grooves) during the insertion process. The roughness of the finished, rotationally symmetrical surface is the same over the whole workpiece and, in particular, is independent of the local angle between the generated surface and the rotation axis of the workpiece. In this variant of the method, the total displacement path VP is covered in step b). Alternatively to the above variant of the method, insertion can, for example, also always take place perpendicularly to the rotation axis of the workpiece.

Further preferred is a variant of the method according to the invention which is characterised in that in step a) the cutting edge in the inserted state executes a slight feed movement EV parallel to the surface to be generated on the workpiece, wherein for the insertion depth ET, which is the amount by which the cutting edge penetrates the workpiece perpendicularly to the surface to be generated on the workpiece during the insertion process, and for the feed movement EV the following applies: $ET \geq EV$, preferably $ET \geq 5*EV$. Owing to the feed movement EV in the inserted state, the cutting edge is held in the inserted state under a cutting force, thereby preventing chattering of the cutting edge. Although an associated groove may then have a slight twist, this twist does not continue in the next groove owing to the subsequent lifting and renewed application of the tool, and the overall surface is again twist-free.

Quite particularly preferred is a variant of the method according to the invention in which a geometrically defined cutter is used as a cutting edge, in particular a lathe tool or an indexable insert with a cutting radius of 1 mm or less, in particular approximately 0.8 mm. In other words, this variant employs the turning method using a turning tool. Particularly marked twist can occur during turning, and therefore the advantages of the invention come into play particularly well, especially the freedom from twist of the generated surface.

In an alternative variant of the method, a geometrically undefined cutter is used as a cutting edge, in particular a rotating grinding wheel. In other words, this variant employs the grinding method. Here too, the method according to the invention improves the quality of the generated surfaces.

Also preferred is a method variant which is characterised in that the length of the displacement path VP amounts to 0.2 mm or less, in particular approximately 0.1 mm. These displacement paths have proved successful in practice and permit continuous implementation of the method with low surface roughnesses of the generated surfaces, using conventional geometries of the cutting edge.

The scope of the present invention also covers a workpiece with a rotationally symmetrical surface, characterised in that the rotationally symmetrical surface is produced by an above method according to the invention. The rotationally symmetrical surface has a characteristic "groove on groove" surface structure.

Further advantages of the invention will become apparent from the description and the drawings. According to the invention, the aforementioned features and the features mentioned hereinbelow can also be employed individually or jointly in any combination. The embodiments shown and described should not be regarded as a definitive list, but instead should be taken as examples intended to illustrate the invention.

BRIEF DESCRIPTION OF THE DRAWINGS

The invention will be further described with the aid of embodiments and is shown in the drawings, wherein.

DETAILED DESCRIPTION

In all Figures, size ratios between workpiece and tool/cutting edge as well as the displacement paths are only shown schematically and not to scale.

Figure 1:
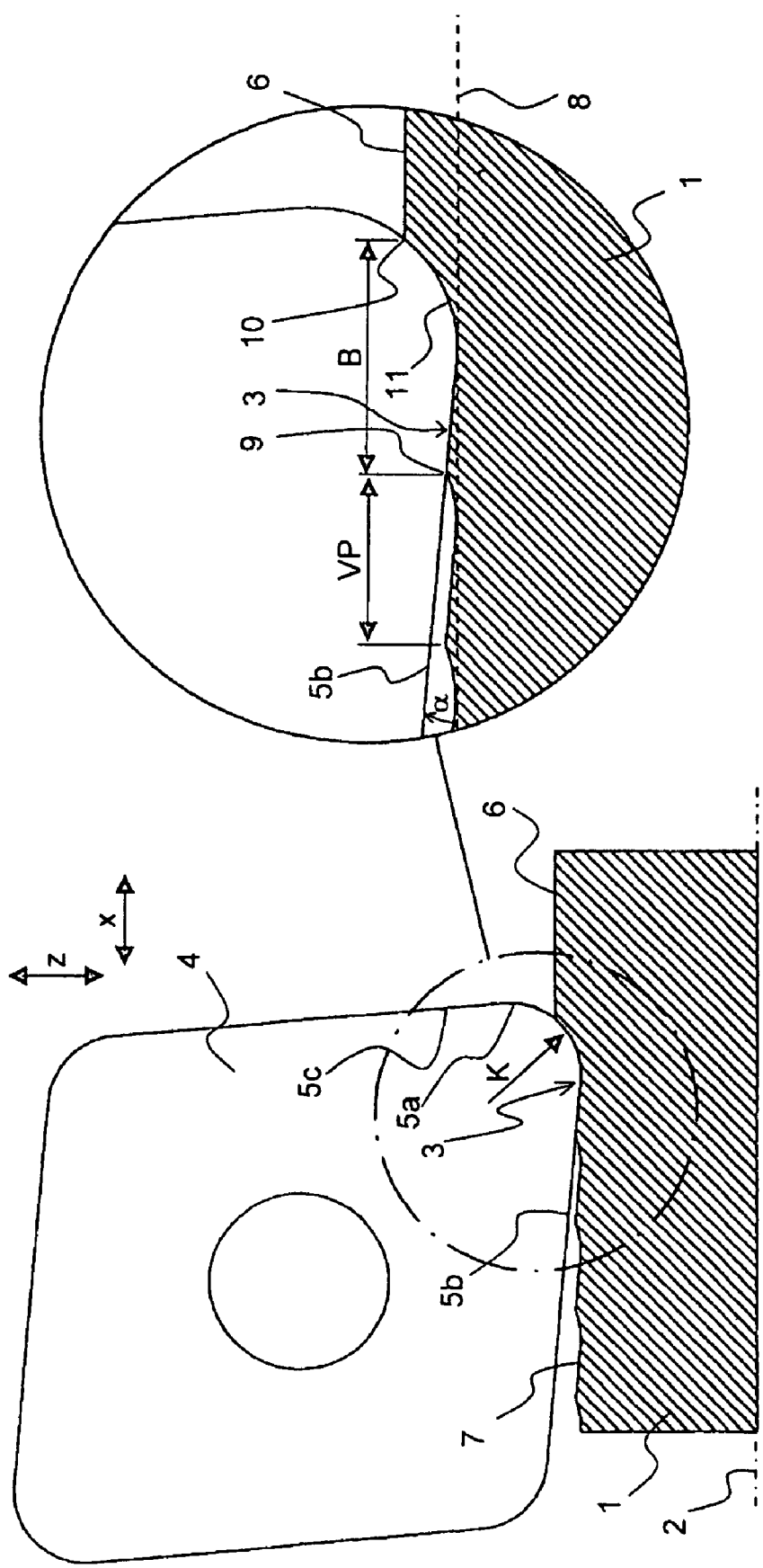
FIG. 1 shows a workpiece and a cutting edge in the inserted state at a first instant of the method according to the invention.
Figure 2:
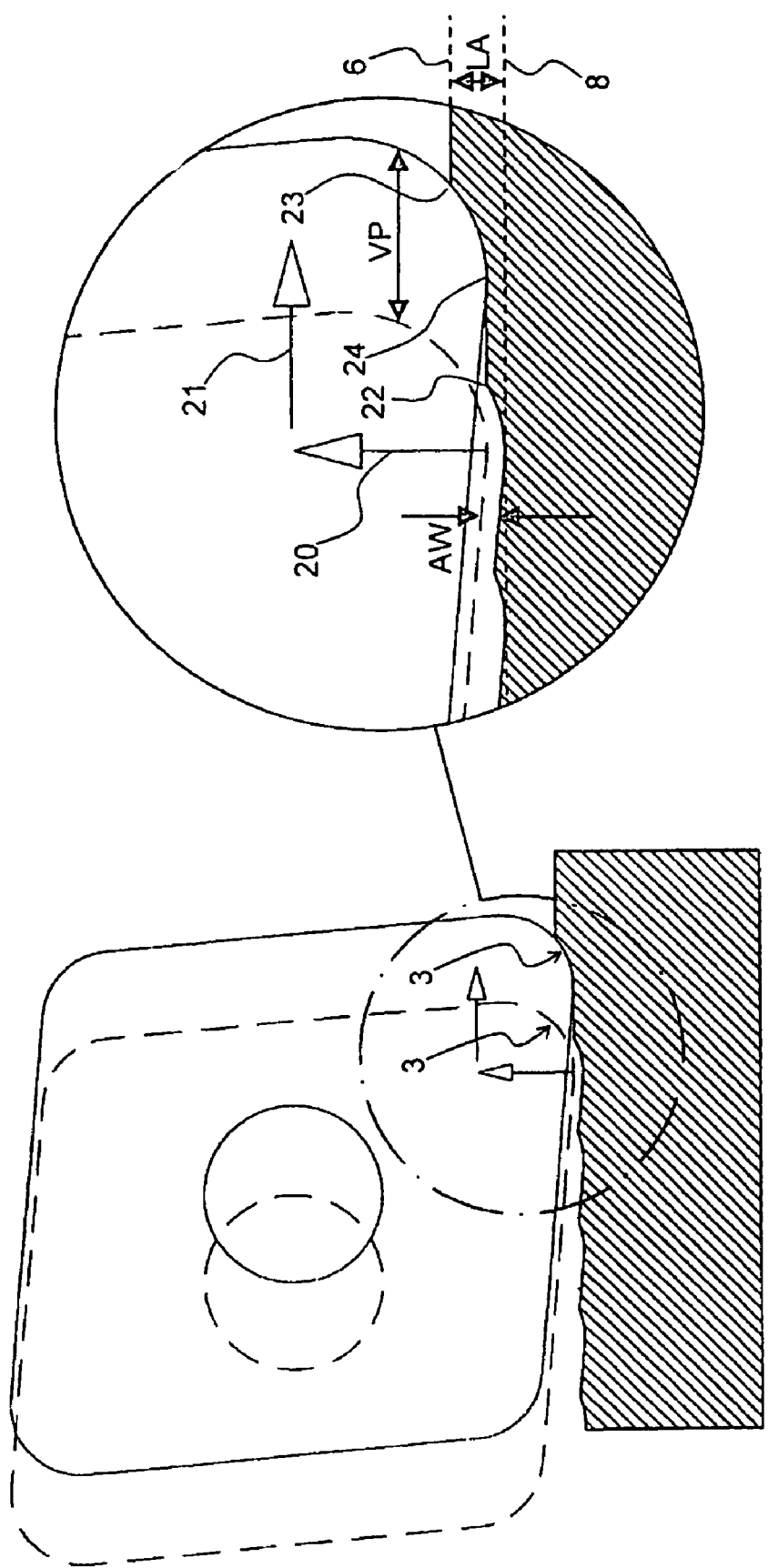
FIG. 2 shows the workpiece and the cutting edge according to FIG. 1, at a second instant after the lifting process (broken line) and at a third instant after the feed movement (solid line)
Figure 3:
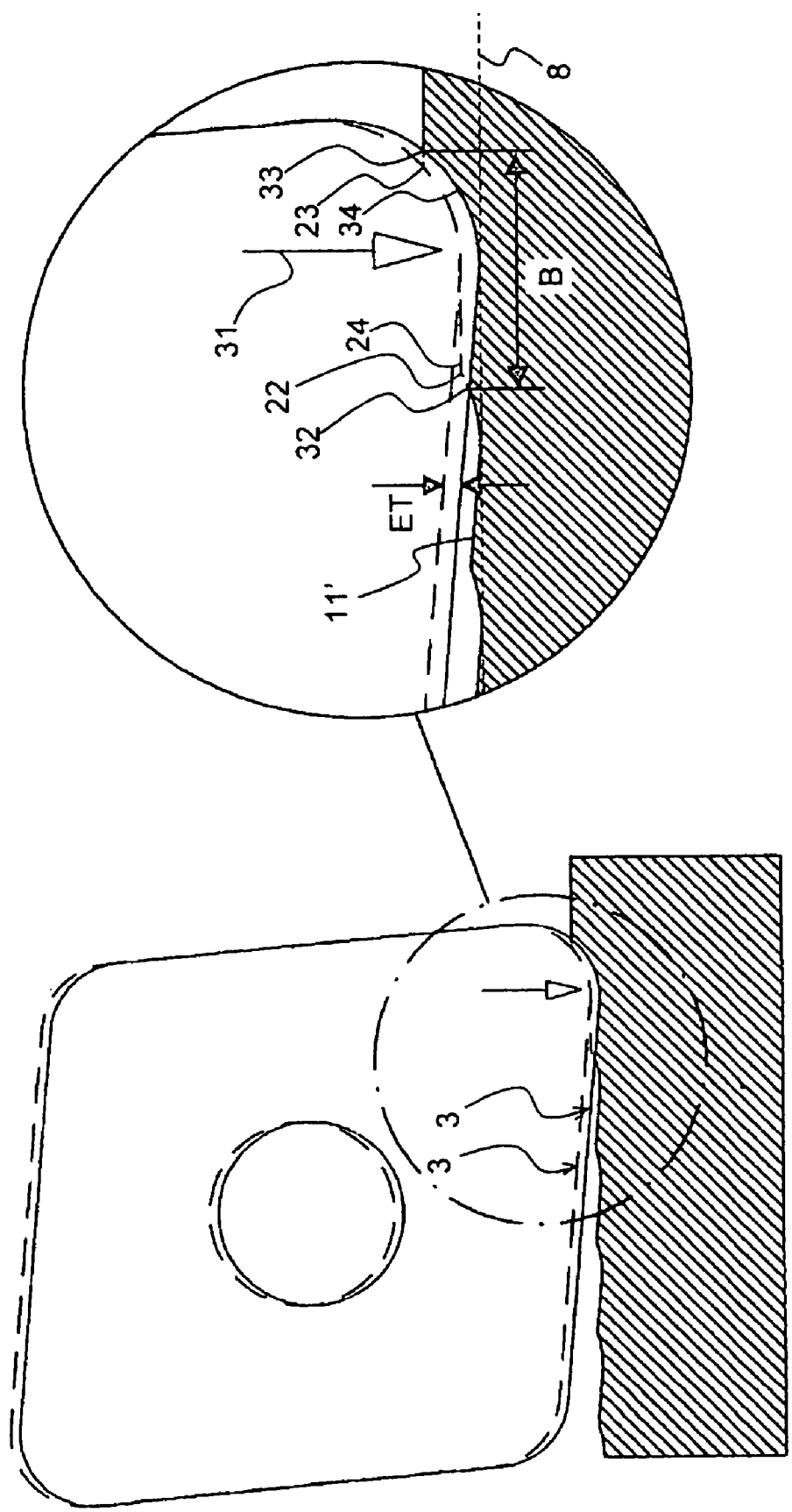
FIG. 3 shows the workpiece and the cutting edge according to FIG. 1 and FIG. 2, again after repositioning at the third instant (broken line) and after renewed insertion at a fourth instant (solid line)

FIGS. 1 to 3 illustrate the sequence of the method according to the invention for generating a rotationally symmetrical surface using the example of turning. The rotationally symmetrical surface generated is a circular-cylindrical outer surface. In each of FIGS. 1 to 3, a general view is shown on the left and, on the right, an enlargement of a detail which is marked by a dot-dash circle. The method sequence corresponds to the flow diagram shown in FIG. 4b (see therein) and is distinguished by continual alternation between recessing and longitudinal turning.

FIG. 1 shows a workpiece 1 which rotates about a rotation axis 2. The workpiece 1 is only partly shown for reasons of simplification. A cutting edge 3 of a tool has been inserted into the workpiece 1.

The tool is formed as an indexable insert 4. The indexable insert 4 has an opening in its middle in order to fasten the indexable insert 4 to a lathe in different positions. The lathe can displace the indexable insert 4 (and thus also the cutting edge 3) in the directions z and x, which extend perpendicularly and parallel to the rotation axis 2.

In the right-hand lower part, the cutting edge 3 comprises a circular arc-shaped region 5a with a radius of curvature K, which merges into a straight region 5b, 5c both towards the left and upwards. In this case, the radius of curvature K is 0.8 mm.

To the right of the cutting edge 3, the workpiece 1 has not yet been turned and has an unmachined contour 6. To the left of the cutting edge 3, the workpiece 1 has already been machined according to the invention and therefore has a generated contour 7.

The generated contour 7 is slightly undulated at intervals, with an interval length corresponding to a displacement path VP (see below). The generated contour 7 thus has a defined roughness. The generated contour 7 approximates a contour or an associated surface 8 to be generated on the workpiece 1. The surface 8 to be generated represents the rotationally symmetrical surface to be produced on the workpiece 1. With suitable selection of the method parameters, the roughness of the generated contour 7 can be set to be very low (in particular 1 μm or less from maximum to minimum) so that the generated contour 7 only deviates negligibly from the surface 8 to be generated or the contour to be generated. In the present case, the surface 8 to be generated is tangent to the minima in the undulating generated contour 7.

FIG. 1 shows the cutting edge 3 in an inserted state after a complete revolution of the workpiece 1 with the cutting edge 3 in the inserted state. The cutting edge 3 has removed material from the workpiece 1 between points 9 and 10 and, in the position shown, is only in contact with the workpiece 1 between points 9 and 10. The part of the cutting edge 3 between points 9 and 10 is also referred to as the "active cutting edge". The cutting edge 3 has formed a new contour portion 11 located between points 9 and 10 on the workpiece 1. This new contour portion 11 is also referred to as a "groove". The new contour portion 11 has a width B. The width B is measured in a direction which extends parallel to the surface 8 to be generated or the contour to be generated.

The generated contour 7 is now to be extended towards the right. The procedure for this is shown in FIG. 2.

The cutting edge 3 is first lifted from the workpiece 1 in arrow direction 20. The position of the cutting edge 3 after lifting is shown by a broken line. In the case shown, this lifting action takes place perpendicularly to the surface 8 to be generated. The lifting path covered in this direction is AW. The lifting path AW is smaller than the local oversize LA, i.e. the distance between the surface 8 to be generated and the unmachined workpiece surface or unmachined contour 6, measured perpendicularly to the surface 8 to be generated. For example, AW can be selected to be 0.01 mm and LA 0.3 mm.

The cutting edge 3 is then advanced in arrow direction 21. The position of the cutting edge 3 after the feed movement is shown by a solid line. In the case shown, this feed movement takes place parallel to the surface 8 to be generated. The feed path covered in this direction, referred to as the displacement path, is VP. The length of the displacement path VP is clearly smaller here than the width B from FIG. 1. For example, VP can be selected to be 0.1 mm. During the feed movement, cf. arrow direction 21, the cutting edge 3 removes material from the workpiece 1, i.e. longitudinal turning is carried out on the workpiece 1. Within the framework of this longitudinal turning, an interim contour portion 24 is formed between points 22 and 23 on the workpiece 1. This interim contour portion 24 is clearly set back in relation to the surface 8 to be generated or the contour to be generated and has a twist.

However, this twist will not appear in the finished workpiece because the interim contour portion 24 will be removed again by recessing during the next insertion, as shown in FIG. 3.

The position of the cutting edge 3 after the feed movement is shown by a broken line in FIG. 3; the associated interim contour portion 24 is likewise shown by a broken line.

From this position, the cutting edge 3 is inserted into the workpiece 1 in arrow direction 31. In the case shown, this insertion takes place perpendicularly to the surface 8 to be generated. The insertion depth of the cutting edge 3 in this direction is ET. In the case shown, ET=AW. It has proved successful if ET≦0.02 mm, in particular approximately 0.01 mm. After insertion and after at least one revolution of the workpiece with the cutting edge inserted, a new contour portion 34 of the workpiece 1 is formed between points 32 and 33 and again has the width B.

Of the newly produced contour portion 11 shown in FIG. 1, only a residual contour 11' remains in FIG. 3. The right-hand part of the contour portion 11 has been removed and incorporated into the new contour portion 34. The residual contour 11' has an extent VP in a direction parallel to the surface 8 to be generated, where VP<B; cf. FIG. 1 in this respect. The newly produced contour portion 34 is directly adjacent to the residual contour 11'.

The method is continued by further cycles of lifting, feeding and insertion. For example, with a displacement path VP of approximately 0.1 mm and an overall width of 1 cm for a rotationally symmetrical surface to be produced, 100 cycles are necessary. A generated contour 7 is formed which consists of a sequence of residual contours (like the residual contour 11'). The residual contours have acquired their shape by recessing.

The roughness of the generated contour 7 is a function of (primarily) the displacement path VP and the form of the cutting edge 3. The smaller the displacement path VP, the less the roughness is. In addition, the smaller the angle α between the surface 8 to be generated and the straight portion 5b of the cutting edge 3, the less the roughness is; cf. FIG. 1. Angles α of 0° to 5°, in particular 1° to 2°, are preferred. It should be noted that "wiper" cutting edges can also be used within the framework of the invention and, instead of a straight portion 5b, have a portion with a larger radius of curvature K' (in comparison with the radius of curvature K of the circular portion 5a).

FIGS. 4a to 4f show a series of displacement diagrams for a cutting edge within the framework of the method according to the invention. In each case, the arrows show the path of the part of the cutting edge that penetrates the furthest towards the surface 8 to be generated (=lower edge). The unmachined contour 6 of the workpiece is shown for further orientation. In each case, three insertion positions and the displacement steps between these insertion positions are shown.

Figure 4A:
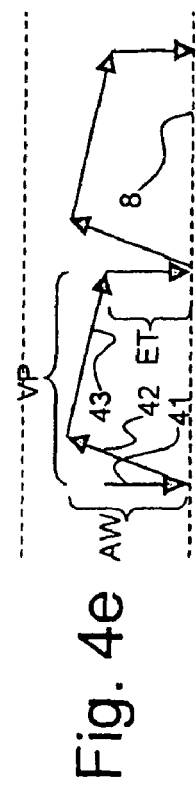
FIG. 4a shows a diagram of a displacement path of the underside of a cutting edge according to a variant of the method according to the invention, wherein the cutting edge is advanced entirely above the workpiece.

FIG. 4a shows a basic variant of the method according to the invention, comprising the sequence of perpendicular insertion 41, perpendicular lifting 42 and parallel feed movement 43, in each case relative to the surface 8 to be generated. Insertion 41 can be assigned to step a), lifting 42 can be assigned to step b1) and the feed movement 43 can be assigned to step b2). In the method variant according to FIG. 4a, material is removed exclusively during insertion 41. It should be noted that the active cutting edge has a width B which is greater than the displacement path VP during the feed movement 43. The cutting edge itself is not shown for reasons of simplification. The lifting path AW during lifting 42 is greater than the local oversize LA. The feed movement 32 takes place exclusively with spacing above and outside the workpiece.

Figure 4B:
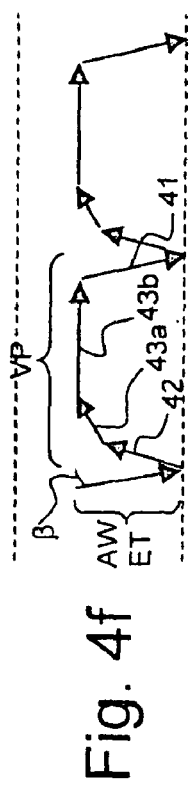
FIG. 4b shows a diagram similar to FIG. 4a, wherein the cutting edge removes material from the workpiece during the feed movement.

FIG. 4b shows the method variant which is illustrated in FIGS. 1 to 3. Insertion 41 and lifting 42 have the same path lengths and take place perpendicularly to the surface 8 to be generated. The lifting path AW is smaller than the local oversize LA so that, during the feed movement 43, the cutting edge is driven through the material. The feed movement 43 takes place parallel to the surface 8 to be generated.

Figure 4C:
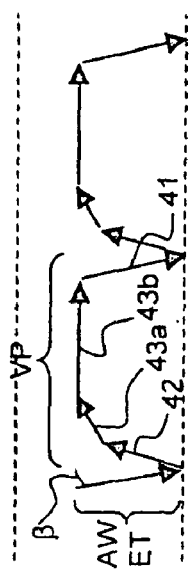
FIG. 4c shows a diagram similar to FIG. 4a, wherein the lifting process and the feed movement take place in a combined method step.

FIG. 4c shows a method variant in which the lifting process and the feed movement are amalgamated into a combined method step 44. The progress of the method can thereby be accelerated.

Figure 4D:
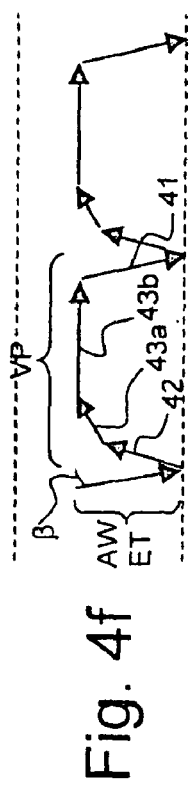
FIG. 4d shows a diagram similar to FIG. 4a, wherein a feed movement EV is executed in the inserted state.

FIG. 4d shows a method variant similar to FIG. 4b, wherein, after insertion 41 and at least during the first revolution of the workpiece with the cutting edge in the inserted state, a small recessing feed movement 45 having the length EV is executed. By means of the recessing feed movement 45, the cutting edge is held under tension in the inserted state, which prevents chattering. EV is preferably very much smaller than VP, in particular VP>10*EV or VP>50*EV. It should be noted that the recessing feed movement 45 also contributes to the length of the displacement path VP in this method variant.

Figure 4E:
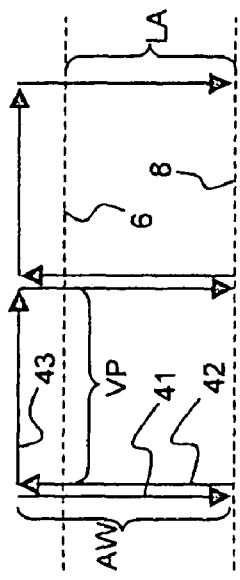
FIG. 4e shows a diagram similar to FIG. 4a, wherein the cutting edge is also advanced during the lifting process and is also moved towards the workpiece during the feed movement.

FIG. 4e shows a method variant in which a movement towards the next insertion position is carried out during the lifting process 42. Moreover, a movement towards the surface 8 to be generated is also carried out during the feed movement 43 so that the lifting path AW is greater than the insertion depth ET.

Figure 4F:
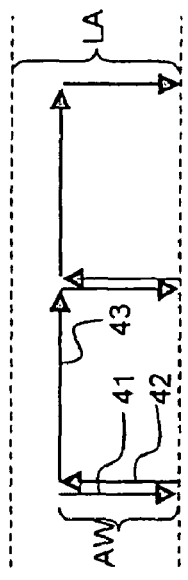
FIG. 4f shows a diagram similar to FIG. 4a, wherein the total lifting path AW is divided between the lifting process and a partial step of the feed movement.

FIG. 4f shows a method variant in which insertion 41 takes place at an angle which deviates slightly from the direction perpendicular to the surface 8 to be generated. The deviation angle β is preferably so small that during insertion the newly forming contour portion widens in both directions (towards the left and the right) parallel to the surface to be generated. Furthermore, the feed movement comprises two partial steps 43a, 43b. In partial step 43a, the cutting edge is removed further from the surface 8 to be generated than during lifting 42, i.e. both the lifting process 42 and the partial step 43a contribute to the lifting path AW. At the end of partial step 43b, the position for the next insertion 41 is reached. It should be noted that insertion 41 also contributes to the length of the displacement path VP between two inserted positions of the tool in this method variant.

According to the invention, a method cycle of insertion, lifting and feeding can, if desired, be broken down into a plurality of partial steps, in particular even more partial steps than shown in FIGS. 4a to 4f. In this case, the partial steps can also comprise curved displacement paths, for example circular paths.

Figure 5A:
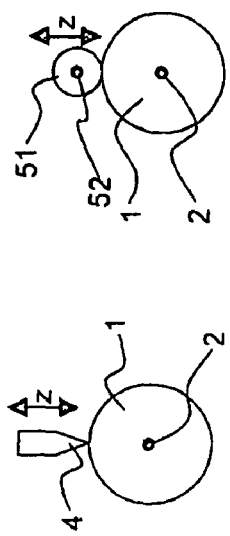
FIG. 5a shows a view of a tool and a workpiece for the turning variant of the method according to the invention.

FIG. 5a shows a view of a basic arrangement for carrying out the turning variant of the method according to the invention. A workpiece 1 rotates about a central rotation axis 2. An indexable insert 4 (or another turning tool) can be displaced in the direction z towards the rotation axis 2 and away from it. Furthermore, the cutting edge 3 can be displaced perpendicularly to the drawing plane in the direction x (not shown). These degrees of freedom of the indexable insert 4 are sufficient for the method according to the invention. A typical rotational speed of the workpiece is 800-1000 rev/min.

Figure 5B:
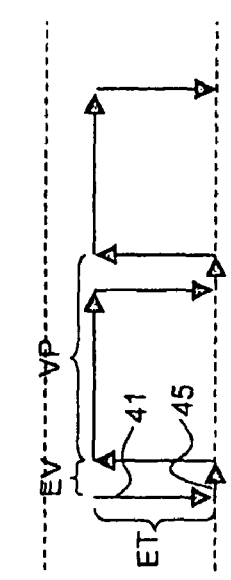
FIG. 5b shows a view of a tool and a workpiece for the grinding variant of the method according to the invention.

FIG. 5b shows a view of a basic arrangement for carrying out the grinding variant of the method according to the invention. A workpiece 1 rotates about a central rotation axis 2. A grinding wheel 51 rotates about a grinding-wheel axis 52, which extends parallel to the rotation axis 2. The grinding wheel 51 can be displaced in the direction z towards the rotation axis 2 and away from it. Furthermore, the grinding wheel 51 can be displaced perpendicularly to the drawing plane in the direction x (not shown). These degrees of freedom of the grinding wheel 51 are sufficient for the method according to the invention. The rotational speed of the grinding wheel 51 is considerably lower than the rotational speed of the workpiece.

To summarise, the invention relates to a method, in particular a turning method, for producing a rotationally symmetrical surface on a rotating workpiece (1), wherein a cutting edge (3) is inserted into the workpiece (1) many times. During each insertion (41), a new contour portion (11; 34), also referred to as a groove, is formed. The insertion positions lie so closely together that the resulting contour (7) generated on the workpiece (1) consists exclusively of adjacent residual contours or residual grooves (11') which have arisen from the new contour portions or grooves (11; 34). Any interim contour portions (24) which have formed between the insertion positions during repositioning of the cutting edge (3) are removed again during the next insertion (41). The resulting rotationally symmetrical surface is twist-free. The method can be implemented using conventional lathes.

What is claimed is:

1. A method of producing a rotationally symmetrical surface on a rotated workpiece wherein a cutting edge is brought into contact with the surface of the rotated workpiece, the method comprising:
   a) engaging the cutting edge with the rotating workpiece as the cutting edge is moved towards the workpiece in order to generate
   a new contour portion on the workpiece with the new contour portion having a width B, measured parallel to the surface;
   maintaining the cutting edge in the engaged position during at least one revolution of the workpiece;
   b) repositioning the cutting edge by means of the following sub-steps:
   b1) lifting the cutting edge from the workpiece as the cutting edge undergoing a movement generally perpendicularly away from the new contour portion;
   b2) advancing the cutting edge as the cutting edge undergoes a movement generally parallel to the new contour portion;
   wherein in step b) a maximum lifting path AW perpendicularly away from the new contour portion is smaller than the local oversize, LA, of the workpiece,
   wherein a total length of the displacement path VP of the cutting edge parallel to the new contour portion in steps a) and b) is smaller than or equal to the new contour width, B; and
   c) steps a) to b) repeated multiple times.

2. The method according to claim 1, wherein the lifting path AW amounts to 0.02 mm or less.

3. The method according to claim 1 wherein the local oversize LA amounts to 0.1 mm to 0.4 mm.

4. A method according to claim 1 wherein in step a) the cutting edge remains in the engaged position during precisely one revolution of the workpiece.

5. A method according to claim 1 wherein sub-step b1) takes place before sub-step b2).

6. A method according to claim 5, wherein in step b1) the cutting edge is moved exclusively perpendicularly away from the new contour portion,
   and in that in step b2) the cutting edge is moved exclusively parallel to the new contour portion.

7. A method according to claim 1 wherein sub-steps b1) and b2) take place simultaneously.

8. A method according to claim 1 wherein in step a), during the movement of the cutting edge towards the new contour portion the cutting edge is moved exclusively perpendicularly to the new contour portion.

9. A method according to claim 1 wherein in step a) the engaged cutting edge in the inserted state executes a slight feed movement EV parallel to the new contour portion, wherein for the insertion depth ET, which is the amount by which the cutting edge penetrates the workpiece perpendicularly to the new contour portion during the insertion process, and for the feed movement EV the following applies: $ET \geq EV$, preferably $ET \geq 5*EV$.

10. A method according to claim 1 wherein a geometrically defined cutter is used as a cutting edge, the defined cutter being a lathe tool or an indexable insert with a cutting radius (K) of 1 mm or less, in particular approximately 0.8 mm.

11. A method according to claim 1 wherein a rotating grinding wheel is used as a cutting edge.

12. A method according to claim 1 wherein the length of the displacement path VP amounts to 0.2 mm or less.

* * * * *